(12) United States Patent
Hans

(10) Patent No.: US 9,901,028 B2
(45) Date of Patent: Feb. 27, 2018

(54) METHOD FOR CONTROLLING A SELF-PROPELLED LAWNMOWER

(71) Applicant: VIKING GmbH, Langkampfen (AT)

(72) Inventor: Matthias Hans, Kiefersfelden (DE)

(73) Assignee: Viking GmbH, Langkampfen (AT)

( * ) Notice: Subject to any disclaimer, the term of this patent is extended or adjusted under 35 U.S.C. 154(b) by 102 days.

(21) Appl. No.: 14/649,555

(22) PCT Filed: Dec. 6, 2013

(86) PCT No.: PCT/EP2013/003693
§ 371 (c)(1),
(2) Date: Sep. 26, 2015

(87) PCT Pub. No.: WO2014/086498
PCT Pub. Date: Jun. 12, 2014

(65) Prior Publication Data
US 2016/0014955 A1    Jan. 21, 2016

(30) Foreign Application Priority Data

Dec. 7, 2012  (EP) .................................... 12008193

(51) Int. Cl.
*A01D 34/00* (2006.01)
*G05D 1/02* (2006.01)
*B25J 9/16* (2006.01)

(52) U.S. Cl.
CPC .......... *A01D 34/008* (2013.01); *B25J 9/1694* (2013.01); *G05D 1/0265* (2013.01);
(Continued)

(58) Field of Classification Search
CPC ..................... G05D 2201/0208; G05D 1/0265
See application file for complete search history.

(56) References Cited

U.S. PATENT DOCUMENTS 5,438,266 A * 8/1995 Tsang ....................... G01V 3/06
324/326
6,300,737 B1 * 10/2001 Bergvall .............. G05D 1/0265
180/167
(Continued)

FOREIGN PATENT DOCUMENTS

DE   10 2010 028 251 A1   10/2011
EP        1 512 054 A1    3/2005
(Continued)

*Primary Examiner* — Timothy R Waggoner
(74) *Attorney, Agent, or Firm* — Gudrun E. Huckett

(57) ABSTRACT

The invention relates to a method for operating a self-propelled lawnmower, which is moved on a surface (20). The surface (20) is surrounded by a border delimitation wire (21) on which electrical signals (16, 116) are transmitted. The transmitted signal (16) is received by at least one receiving coil (17, 18) in the lawnmower (2) and induces a reception signal (EI), which is evaluated in an evaluation unit (19). The evaluation unit (19) emits an output signal to a control unit (13), on the basis of which the control unit (13) controls the direction of travel of the lawnmower (2). In order to guarantee a safe operation of the lawnmower even in range of electromagnetic interference fields, the invention provides that the electrical signal (16, 116) is transmitted with a predetermined pattern (M). The evaluation unit (19) of the lawnmower (2) processes the reception signal (EI) as a pattern, wherein the pattern (M') of the reception signal (EI) is compared to a predetermined reference pattern (RM). Information regarding the location of the lawnmower (2) inside or outside the border delimitation wire (21) is obtained from the comparison result. The control unit (13) will determine the direction of travel of the implement on the basis of this information.

15 Claims, 4 Drawing Sheets

(52) U.S. Cl.
    CPC ..... *G05D 2201/0208* (2013.01); *Y10S 901/01* (2013.01); *Y10S 901/41* (2013.01); *Y10S 901/46* (2013.01)

(56) References Cited

U.S. PATENT DOCUMENTS

| | | | | |
|---|---|---|---|---|
| 7,613,543 | B2* | 11/2009 | Petersson | G05D 1/0265 180/167 |
| 8,046,103 | B2* | 10/2011 | Abramson | G05D 1/0265 367/103 |
| 8,549,826 | B2* | 10/2013 | Kraft | G05D 1/0265 56/10.2 A |
| 2010/0300788 | A1* | 12/2010 | Cox | B61L 3/225 180/167 |
| 2013/0154688 | A1* | 6/2013 | Petereit | G05D 1/0265 327/72 |

FOREIGN PATENT DOCUMENTS

| | | |
|---|---|---|
| EP | 1 612 631 A1 | 1/2006 |
| EP | 2 413 214 A1 | 2/2012 |
| WO | 99/15941 | 4/1999 |
| WO | 03/104909 A1 | 12/2003 |

\* cited by examiner

METHOD FOR CONTROLLING A SELF-PROPELLED LAWNMOWER

BACKGROUND OF THE INVENTION

The invention concerns a method for operating a self-propelled battery-operated power tool, in particular a self-propelled lawnmower, comprising an electrical propelling drive by means of which the power tool is moved across a surface, wherein the surface is surrounded by a border delimitation wire through which electrical signals are sent and the electromagnetic field of a sent signal is received by at least one receiving coil within the power tool and induces a received signal, wherein the received signals of a receiving coil are evaluated in an evaluation unit of the power tool and the evaluation unit outputs an output signal to a control unit of the power tool which, as a function of the output signal, controls the travel direction of the power tool.

Self-propelled lawnmowers are known in general. EP 1 025 472 B1 discloses a system comprised of a battery-operated lawnmower with an electric propelling drive that, for determining the travel direction and the travel speed, is controlled by a control unit. The surface to be mowed by the lawnmower is defined by a border delimitation wire and two signals are to be applied simultaneously onto its wire loop. A first alternating voltage signal oscillates at a first frequency and a second alternating voltage signal oscillates at twice the frequency. In receiving coils within the lawnmower, the alternating electromagnetic fields of the permanently sent alternating voltage signals induce received signals that are evaluated by an evaluation unit in such a way that a conclusion can be made whether the power tool is located within or outside of the wire loop. When the first signal crosses the zero line, a reference point is set. At this point in time the system checks where the subsequent maximum of the second signal that is oscillating at twice the frequency is located. When it is on the plus side, the receiving coil of the robot mower is within the wire loop; when it is on the minus side, the receiving coil of the robot mower is outside of the wire loop. Based on this evaluation, the travel direction of the lawnmower is controlled.

EP 1 512 054 A1 discloses a control for a self-propelled battery-operated lawnmower wherein the field strength of the received electromagnetic field of signals sent through the wire loop is evaluated. The travel direction of the power tool is determined based on the strength of reception of the received signal.

A problem with known self-propelled lawnmowers is the occurrence of random external and internal electromagnetic field interferences that in practice may reach the magnitude of the received signal and can even be greater. Such interferences can be caused internally by the drive motors of the lawnmower or its motor power electronics or externally by external high-voltage lines, radio signals or even other neighboring robot mowers. When interferences occur, a precise determination of the location of the robot mower within or outside of the wire loop is made more difficult or even impossible.

It is an object of the invention to provide a method for operating a self-propelled battery-operated power tool that, with minimal technical expenditure, can operate even in areas of strong electromagnetic field interferences in a safe and failure-free way.

SUMMARY OF THE INVENTION

This object is solved in accordance with the following features:

the electrical signal is sent as a signal with a predetermined pattern, the evaluation unit of the power tool processes the received signal received in a receiving coil as a pattern, the evaluation unit compares the received signal with a predetermined stored reference pattern, the comparison result represents information about the position of the receiving coil within or outside of the border delimitation wire and thus about the location of the power tool on the surface, and, depending on the comparison result, the control unit controls the travel direction of the power tool.

The electrical signal that is applied to the wire loop of the border delimitation wire for location determination of the power tool is configured as a signal with a predetermined pattern. The pattern is selected in this context such that even for strong distortion due to electromagnetic interference fields it can still be detected and evaluated with an acceptable technical expenditure.

The evaluation unit of the power tool processes the received signal of the receiving coil as a pattern, wherein the received signal is compared with a predetermined stored reference pattern. Based on the comparison result, information in regard to the location of the receiving coil within or outside of the border delimitation wire and thus in regard to the location of the power tool on the surface can be obtained. Depending on the comparison result, the control unit will govern the travel direction of the power tool such with the goal that the receiving coil will again be located within the border delimitation wire and the power tool will work on the entire surface that is delimited by the border delimitation wire.

The method according to the invention is disturbance-insensitive with respect to random external or internal electromagnetic fields. Such interference signals can be triggered within the power tool by the drive motors and the motor power electronics or caused externally by high-voltage lines, radio signals or neighboring robot systems.

Advantageously, the signal that is applied onto the wire loop is a burst signal with a digital pattern, in particular with a stochastic digital pattern, which can be recognized reliably even under extreme field interferences. The pattern of the burst signal is comprised preferably of fixed high levels and fixed low levels. The pattern is characterized in that the duration of the levels is different. Other forms and configurations of a pattern of the burst signal can also be advantageous.

In a further embodiment of the invention, between sequential burst signals an intermission is provided so that an evaluation unit which is downstream of the receiving coil can determine unequivocally the beginning and the end of a burst signal. In this way, the technical expenditure for evaluation of the signals can be kept low. Moreover, it is ensured that the totality of the pattern is received, i.e., is available with its full temporal length for evaluation.

The temporal sequence of the burst signals on the wire loop can be random. Expediently, the intermissions between sequential burst signals are provided with a fixed duration.

The embodiment of an intermission between sequential burst signals increases the operational safety of other self-propelled power tools which are operated at the same time in close surroundings. In the intermission between the burst signals, self-propelled power tools that are operated in the surroundings have the possibility to reliably receive the correlated signal that is sent through their border delimitation wire without this signal being overlaid by the electromagnetic field of a simultaneous burst signal of the power tool according to the invention. The intermissions between the burst signals provide in this way the possibility to operate different self-propelled power tools independent of each other in close surroundings, wherein the second signals correlated with a second power tool are always sent when between the first signals correlated with the first power tool an intermission is existing, and vice versa. Due to the embodiment according to the invention of intermissions between the signals on a border delimitation wire, the additional self-propelled power tools that are operated in close surroundings are thus provided with the opportunity to receive the signals correlated with them without interference. In this context, signals correlated with the additional power tool can be sent through the same border delimitation wire as the first signals or through an additional border delimitation wire which is separate therefrom.

The intermissions between the signals of the power tools operated in the close surroundings and the intermissions between the signals of the power tools according to the invention must not be synchronized. The signals of the power tool operated in the close surroundings and the signals of the power tool according to the invention are running temporally independent of each other. In this context, it is accepted that some signals will overlap and can be received only badly or not without error. According to the invention, it is provided that the temporal intermission between sequential signals for a first power tool on a border delimitation wire is greater than the duration of the signal itself. The duration of a desired signal is smaller than the duration of an intermission. Even when the signals overlap, subsequently states will occur in which a distinct separation of the signals exists. The first signal is sent in the intermission of the second signals and the second signal is sent in the intermission of the first signals. An interference-free reception of the signals correlated with one power tool is ensured. A temporally limited overlap of the signals with the result of an incomplete signal or a signal received with disruptions is of subordinate importance for the operation of the power tool because soon thereafter signals will be received again without interference.

It can be expedient to send in the intermission between sequential burst signals any other types of signals, for example, additional burst signals with other patterns, for example, for controlling additional power tools or other actuators.

In another advantageous embodiment of the invention, the signal which is sent by means of the border delimitation wire is a deterministic analog alternating current signal with a period of predetermined temporal length.

It can be expedient to provide a temporally defined receiving window within which the reception of the signal which is sent via the wire loop is realized in a receiving coil. Opening and closing of the receiving window is advantageously adjusted to the sequence of signals that are sent via the wire loop or to their period duration.

The received signal received in the receiving coil is a temporal derivative $U \sim dI/dt$ of the signal which is sent through the border delimitation wire wherein the pattern of the received signal as a whole is evaluated for obtaining a meaningful comparison result.

In an advantageous manner, the comparison of the pattern of a received signal with a reference pattern is done by correlation. The result of correlation, i.e., the comparison result, is the value W of an output signal which is in the range "1"≤W≤"-1" and represents a conclusion in regard to the similarity of the pattern of a received signal with the reference pattern. When the value W of the output signal is "-1", an inverted match of the pattern in the received signal E1 with the reference pattern RM is present. The value W="0" indicates that no correlation with the pattern exists. When the value W is "1", a complete match of the pattern in the received signal with the reference pattern RM is present. As a function of the value W of the similarity of the patterns compared with each other, a conclusion is possible whether the receiving coil of the power tool is located within the wire loop (similarity "1") or outside of the wire loop (similarity "-1"). The result of the correlation is a value W in the range of 1≤W≤-1; in the context of the comparison, the value "1" is assigned to a respectively calculated result of e.g. 0.92, while the value "-1" is assigned to a calculated result of e.g. -0.86.

The signal processing according to the invention provides the possibility that a first surface that is surrounded by a first border delimitation wire and a second surface that is surrounded by a second border delimitation wire can overlap each other without the received signals of the power tools working on the surfaces impairing each other. In this context, the wires can also be placed on top of each other so that the wire loop can have the form of a figure eight, for example, is comprised of two circles or rectangles. At the center, a common wire can be positioned or two wires can be positioned directly on top of each other. This configuration of a wire loop is to be understood as overlapping in the meaning of the claim.

BRIEF DESCRIPTION OF THE DRAWINGS

Further features of the invention result from the additional claims, the description, and the drawings in which an embodiment of the invention explained in the following in detail is illustrated. It is shown in:

DESCRIPTION OF PREFERRED EMBODIMENTS

Figure 1:
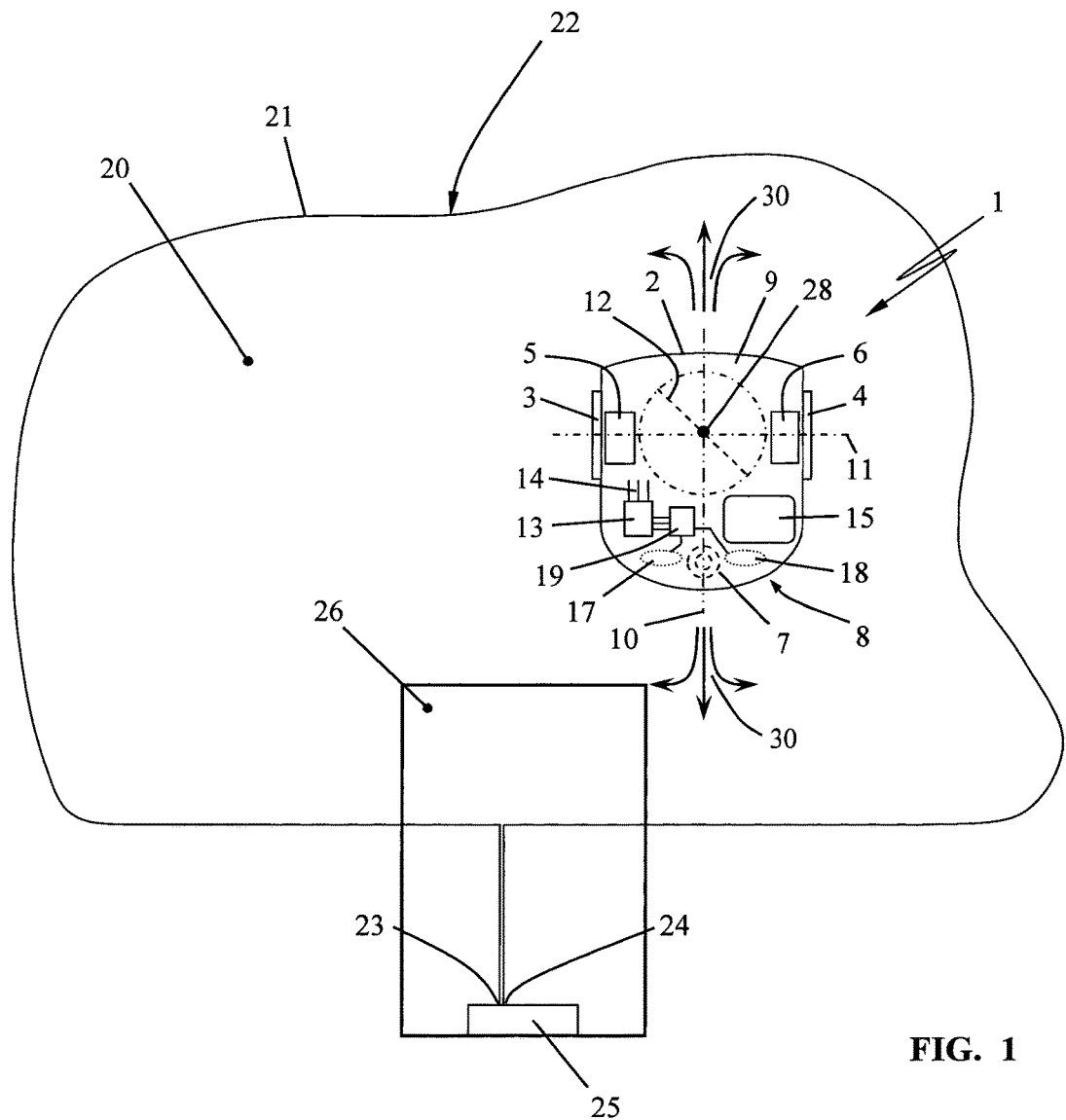
FIG. 1 a schematic plan view of a self-propelled battery-operated power tool exemplified by a self-propelled lawnmower within a border delimitation wire.

In FIG. 1, a power tool 1 is shown in general that in the embodiment is designed as a self-propelled lawnmower 2. The power tool 1 is comprised essentially of a carriage with rear drive wheels 3 and 4, each having preferably an electric drive motor 5 or 6 correlated therewith. In a front area 8 of the housing 9 of the power tool 1, a self-steering third wheel 7 is arranged. The third wheel 7 is preferably arranged on a longitudinal center axis 10 of the housing 9 so that the power tool 1 is designed like a tricycle. A carriage with four wheels can be expedient wherein two or more wheels may be steerable.

In the embodiment, the drive wheels 3 and 4 rotate about a common drive axis 11 which is substantially positioned at a right angle relative to the longitudinal center axis 10 of the housing 9. The drive wheels 3, 4 are to be synchronously driven by their electric drive motors 5 and 6 for traveling straight ahead or, when maneuvering a curve, are to be driven separate from each other so that the power tool 1 can be steered in any desired travel direction.

On the side of the carriage that is facing the surface 20 to be worked on, a working tool 12 is arranged between the drive wheels 3 and 4, in the illustrated embodiment a cutter blade of a lawnmower 2 which is rotating about a vertical axis of rotation 28.

The control of the electric drive motors 5 and 6 is realized by a control unit 13 which is connected by schematically indicated electrical lines 14 with the expediently separately provided drive motors 5 and 6.

The electric power supply of the control unit 13 and of the drive motors 5 and 6 is ensured by a battery pack 15 that is inserted into the housing 9 of the power tool 1.

With appropriate control of the drive motors 5 and 6, the control unit 13 moves the power tool 11 on the surface 20 to be worked on which is surrounded by a border delimitation wire 21. The border delimitation wire 21 is provided as a closed wire loop 22 whose ends 23 and 24 are connected to a sending unit 25.

The sending unit 25 connected to the border delimitation wire 21 can be part of a docking station 26 in which the battery pack 15 of the power tool 1 is charged. For this purpose, the power tool 1 docks at the docking station 26 wherein electrical contacts for charging the battery pack 15 provide a connection with a charge device of the docking station 26.

The sending unit 25 supplies electrical signals 16 to the wire loop 22 based on which the power tool 1 is controlled. The sequence of signals 16 sent through the border delimitation wire 21 of the wire loop 22 is illustrated in an exemplary fashion in FIG. 2.

Figure 3:
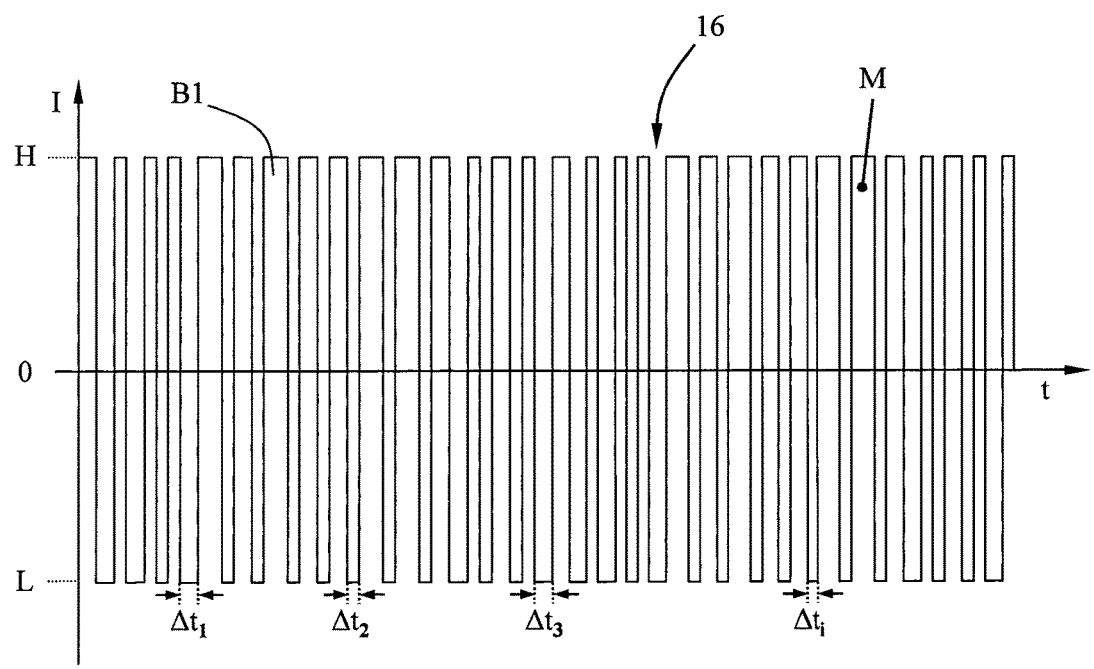
FIG. 3 in enlarged illustration a single signal of the sequence of FIG. 2.

One embodiment of an electrical signal 16 sent through the border delimitation wire 21 of the wire loop 22 is illustrated in enlarged illustration in FIG. 3. The electrical signal 16 is preferably designed as a burst signal B1 with the predetermined pattern M. The pattern M of the burst signal B1 is a digital signal, in particular a stochastic digital signal, that is comprised of fixed high levels H and fixed low levels L, wherein the duration $\Delta t_i$ of the levels H, L is different. In the embodiment, an intermission P with an intermission duration $\Delta T$ is provided, respectively, between the individual burst signals B1 sent through the border delimitation wire 21 of the wire loop 22.

Figure 2:
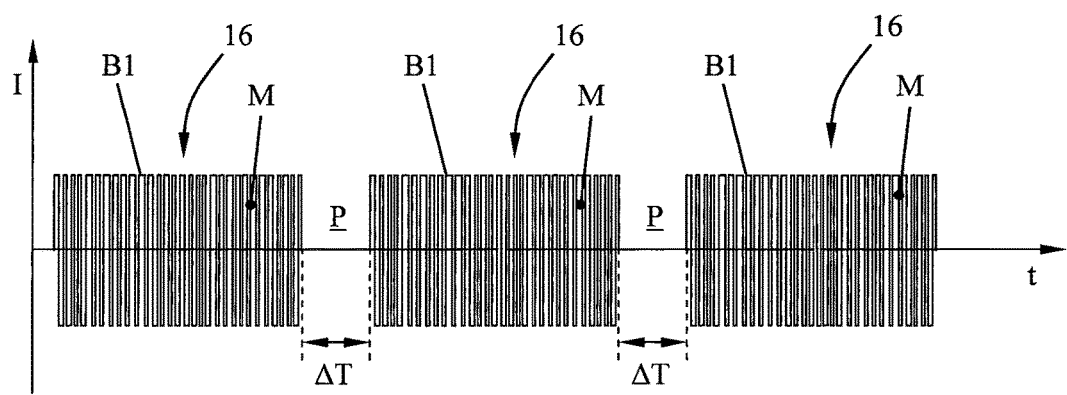
FIG. 2 a schematic view of a sequence of electrical signals sent through the border delimitation wire in the form of stochastic digital alternating current signals.
Figure 9:
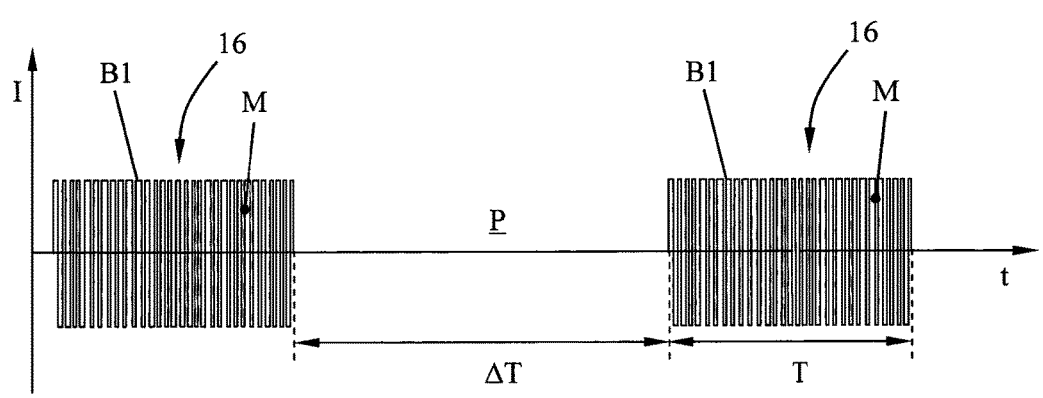
FIG. 9 a schematic view of a sequence of electric signals sent through the border delimitation wire with an intermission provided between the signals that is longer than the desired signal.

As shown in FIG. 2, the intermission duration $\Delta T$ between sequential burst signals B1 can have a fixed duration. It can be expedient to randomly select the temporal sequence of the burst signals on the wire loop 22; the intermissions P then have random intermission durations $\Delta T$. In an advantageous embodiment of the invention, according to FIG. 2 or FIG. 9 it is provided that the intermission durations $\Delta T$ between sequential signals B1 is greater than the signal durations T themselves. The desired signal is temporally shorter than a temporal intermission P that is provided between the desired signals. In FIG. 9, the intermission P has a duration $\Delta T$ which is approximately twice as long as a signal duration T.

The pattern M of the digital burst signal B1 is determined in that the duration $\Delta t_1, \Delta t_2, \Delta t_3, \ldots \Delta t_i$ of the respective levels H and L, as shown in the embodiment, are different. The pattern M of the burst signal is determined by the duration of the levels H and L. Such a burst signal B1 is applied to the border delimitation wire as a result of the current pulses with high levels H and low levels L of different duration $\Delta t_i$.

Each electrical burst signal B1 sent through the border delimitation wire 21 generates an alternating electromagnetic field about the border delimitation wire 21 which is received by receiving coils 17 and 18 in the housing 9 of the power tool 1. In the illustrated embodiment, in the housing 9 on each longitudinal side of the longitudinal center axis 10 of the power tool 1 one receiving coil 17 and 18 is positioned; in the power tool 1, further receiving coils can be expediently provided, or the provided receiving coils 17, 18 can be arranged at another location, for example, one receiving coil 17 and 18 at the front and rear, respectively, on the longitudinal center axis 10 of the power tool 11.

The receiving coils 17, 18 illustrated in FIG. 1 are connected electrically with the control unit 13. By means of its generated alternating electromagnetic field, each electric signal 16 or burst signal B1 sent through the border delimitation wire 21 will induce an alternating current in the receiving coils 17, 18. The induced received signal E1 is in this context the temporal derivative of the burst signal B1 applied onto the wire loop 22. The pattern of the received signal E1 is thus approximately the temporal derivative M'~dI/dt of the pattern M of the burst signal B1. This pattern M' of the received signal E1 (FIG. 4) is supplied to an evaluation unit 19. In the evaluation unit 19, the patterns M' of the induced received signals E1 are evaluated and, as a function of a performed comparison, an output signal is generated that is transmitted from the evaluation unit 19 to the control unit 13. The control unit 13 controls in accordance with the output signal the drive motors 5 and 6 of the propelling drive and determines in this way the travel direction 30 (FIG. 1) of the power tool 1.

The electromagnetic field which is generated by the pattern M of the burst signal B1 will always be received by at least one of the receiving coils 17 and 18 of the power tool 1 wherein upon arrangement of two receiving coils 17, 18 the same burst signal B1 is simultaneously received twice, i.e., the received signal E1 is thus present twice. When both receiving coils 17 and 18 are located within or outside of the wire loop 22, the patterns M' of the received signals E1 are approximately the same. By correlation of the received signals E1 that are simultaneously received interferences can be filtered out as well as reception gaps. When the received patterns M' are different, one receiving coil 17 is within and another receiving coil 18 is outside of the wire loop 22. The power tool is thus located above the border delimitation wire 21.

Figure 6:
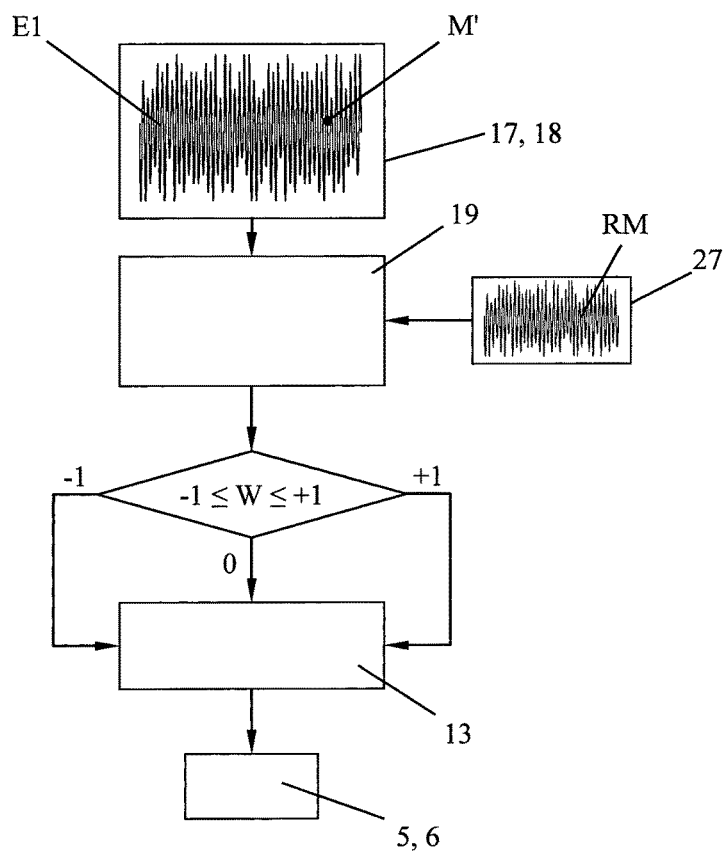
FIG. 6 a schematic flow diagram for evaluation of received signals which are received in a receiving coil in the power tool.

The evaluation unit 19 of the power tool 1 processes the pattern M' of the induced received signal E1 of each of the receiving coils 17, 18. This pattern M' corresponds approximately to the temporal derivative M'~dI/dt of the pattern M of the signal 16 sent through the wire loop 21. In FIG. 6, processing of the received pattern M' according to the method of the present invention is schematically represented. The electromagnetic field of the electrical signal 16 sent through the wire loop 22 induces in the receiving coils 17 and 18 a received signal E1 which is supplied to the evaluation unit 19. The evaluation unit 19 compares the pattern M' of the received signal E1 with a reference pattern RM which is made available to the evaluation unit 19, for example, through a memory 27.

The pattern M' of the received signal E1 is evaluated by means of correlation. In this context, the recognition of the reference pattern RM in the pseudo-stochastic received signal E1 is realized as an algorithm in the frequency range. According to a suitable correlation method, in the evaluation unit 19 the pattern M' of the received signal E1 that is emitted by the receiving coils 17, 18 is permanently compared with the reference pattern RM and a sliding measure of similarity is determined as an output signal. The output signal of the correlation ranges between the value W=−1 (inverted match of the pattern M' in the received signal E1 with the reference pattern RM), the value W=0 (no match of the compared patterns), and the value W=1 (complete match of the pattern M' in the received signal E1 with the reference pattern RM). The value W of the output signal of the evaluation unit 19 is transmitted to the control unit 13 which, as a function of the value W of the output signal, determines whether the receiving coil of the power tool 1 is within the wire loop 22 (similarity "1") or outside of the wire loop 22 (similarity "−1"). When no similarity value is determined by the correlation method, an output signal "0" is output. When value "0" is maintained for a predetermined length of time, the power tool 1 is shut down for safety reasons.

The result of the correlation is not a fixed value "1" or "−1"; in practice, any values W in a range between −1≤W≤1 will occur as a result, wherein the values W of similarity will then be assigned the state "1" or the state "−1" by the evaluation unit 19. When a similarity value of e.g. 0.83 is determined, the state "1" will be assigned to this value; when the similarity value W is e.g. 0.3, a reliable conclusion in regard to the similarity of the pattern is not possible—the value "0" will be output.

As a function of the correlated similarity values "−1" and "+1", the control unit 13 will control the travel direction of the power tool 1 in such a way that a travel direction 30 is selected with which the residence of the receiving coils 17, 18 within the wire loop 22 is ensured; in this way, the power tool 1 is maintained within the surface 20 to be worked on.

The comparison of the pattern M' of the received signal E1 with the reference signal RM enables in a simple way the determination whether the location of the power tool 1 is within or outside of the border delimitation wire 21, i.e., within or outside of the wire loop 22. Depending on this information, the control unit 13 will change the travel direction 30 of the power tool in order to move the power tool 1 again into the area within the wire loop 22.

Figure 4:
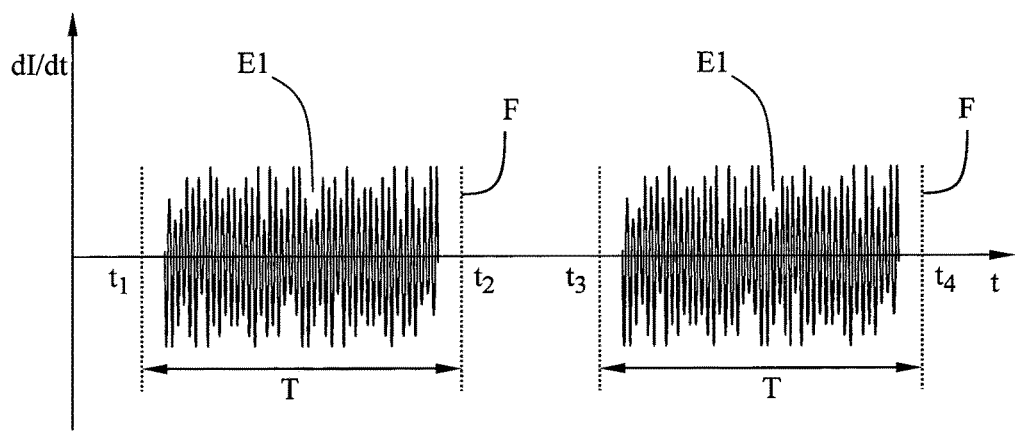
FIG. 4 in schematic illustration, the received signal induced in a receiving coil of the power tool.

Advantageously, a receiving coil 17, 18 receives a complete burst signal B1 within a temporally predetermined receiving window F of the duration T, as illustrated in FIG. 4. Expediently, opening and closing of a receiving window F is adjusted to the sequence of the burst signals B1 on the wire loop 22 so that a burst signal B1 is always completely received, i.e., a complete pattern M' is represented within the received signal E1.

Since, aside from the burst signals B1 on the wire loop, in the operating range of such a power tool 1 electromagnetic interference fields and the like will regularly interfere, the received signal E1 is overlaid by corresponding interference parameters. However, by means of the correlation a safe recognition of the pattern M or of the pattern M' is possible and a safe conclusion can be obtained whether the similarity of the patterns to be compared is "−1" or "+1", i.e., whether the power tool 1 is thus moving within or outside of the wire loop 22.

The correlation value which is calculated for determining the similarity can also be averaged and, in this way, provides information in regard to the quality of the received signal E1.

Figure 5:
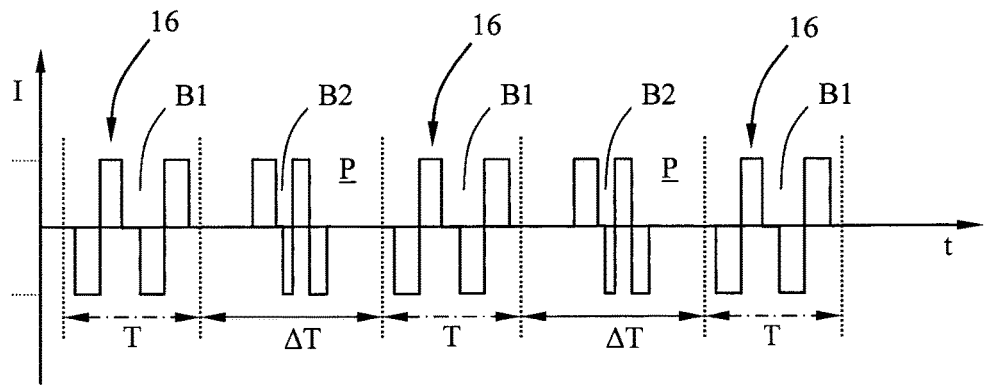
FIG. 5 an embodiment of a sequence of different electrical signals which are sent through the border delimitation wire.

With the method according to the invention, several bursts signals B1, B2, . . . Bn can also be sent through the wire loop 22, as illustrated in FIG. 5. Accordingly, it may be expedient to send any other signals, for example, second burst signals B2, in an intermission between sequential first burst signals B1. The patterns of the burst signals B1 and B2 are different, as schematically indicated in FIG. 5. Accordingly, a first power tool 1 can operate without disturbances with the burst signal B1 while at the same time an adjacently operating power tool can operate without disturbances with the burst signal B2. In this context, it is provided that the intermission time ΔT of an intermission P is greater than the signal time T of a burst signal B1. The intermission is thus longer than the desired signal. A mutual influence of neighboring systems can thus be avoided by selecting different patterns M of the burst signals B1, B2. In this way, there is also the possibility of utilizing a single border delimitation wire 21 as a separation between two surfaces that are to be worked on by different power tools.

Figure 7:
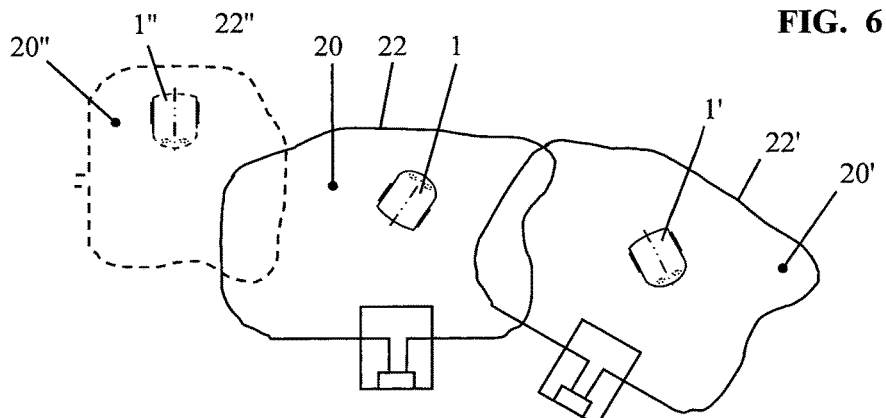
FIG. 7 in schematic illustration the arrangement of several wire loops of neighboring systems overlapping each other.

As shown in FIG. 7, the wire loops 22, 22', 22" of neighboring systems can also overlap so that two or more, even overlapping, surfaces 20, 20', 20" result that are to be worked on by two or more power tools 1, 1', 1". Since the sent signals on the wire loops have different patterns, the power tools 1, 1', 1" can orient themselves based on the correlated reference patterns which each are saved in the memory 27 (FIG. 6) of the respective power tool 1, 1', 1". Each power tool 1, 1', 1" works exclusively on the surface 20, 20', 20" assigned to it by the saved reference pattern, without the signals sent through the wire loops 22, 22', 22" or the received signals evaluated in the power tools 1, 1', 1" mutually disturbing each other. In this context, it is possible to send the signals through the wire loops so as to be temporally independent from each other so that the different patterns of the different systems overlap each other or are even superimposed. As a result of the evaluation by correlation there is still a precise reliable detection of the pattern which is correlated with one power tool.

Also, with only one power tool 1 the surfaces can be successively worked on in that the reference pattern of the power tool to be used in the comparison is switched to the corresponding signal of the wire loop 22, 22', 22". Depending on the selected reference pattern, the same power tool is working within the wire loop 22 or 22' or 22". In this way, with only one power tool a plurality of surfaces can be processed automatically in that, for example, a time-dependent switching of the employed reference pattern is performed, expediently by means of an appropriate programming. Accordingly, in one power tool several reference patterns can be stored and, depending on the situation of use, a predetermined reference pattern for evaluation of the patterns of the received signals can be activated. The same power tool is thus utilizable for different systems with signals of different pattern.

Figure 8:
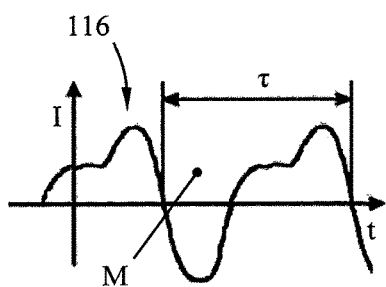
FIG. 8 a schematic view of alternative electrical signals sent through the border delimitation wire as deterministic analog alternating current signals.

The embodiment has been explained with the aid of a quasi stochastic digital signal 16 with imprinted pattern M. Alternatively, as a signal 16, a deterministic analog signal 116 can be also employed which has a corresponding pattern M impressed thereon. Such a deterministic analog alternating current signal can be a signal 116 as illustrated in FIG. 8. The pattern M of the signal 116 has expediently a period τ.

What is claimed is:

1. A method for operating a self-propelled battery-operated power tool, the power tool comprising an electrical propelling drive configured to move the power tool across a first surface surrounded by a first border delimitation wire, the power tool further comprising at least one receiving coil, an evaluation unit, a memory, and a control unit, the method comprising:

storing a predetermined reference pattern in the memory within the power tool;

sending sequentially a plurality of electrical burst signals, each comprising a predetermined digital pattern, through the first border delimitation wire;

providing an intermission between the sequential burst signals, so that each burst signal sent through the first border delimitation wire has an explicit beginning and an explicit end;

each of said burst signals generating an electromagnetic field;

receiving said electromagnetic field generated by one of said burst signals in the at least one receiving coil within the power tool;

the electromagnetic field inducing a received signal in the at least one receiving coil, wherein the evaluation unit is configured to determine unequivocally said beginning and said end of said burst signal and therefore the technical expenditure for evaluation of the received signal can be kept low;

evaluating the received signal of the at least one receiving coil in the evaluation unit by processing the received signal as a received pattern and comparing by correlation the received pattern with said stored predetermined reference pattern stored in the memory, wherein an output signal of a comparison result of the step of comparing is in a range between "1" and "−1" and represents information about a position of the at least one receiving coil within or outside of the first border delimitation wire and about a location of the power tool on the surface;

the evaluation unit outputting the output signal of the comparison result to the control unit;

the control unit, depending on the comparison result, controlling a travel direction of the power tool.

2. The method according to claim 1, further comprising the electrical burst signal consisting of a digital pattern.

3. The method according to claim 2, further comprising selecting the digital pattern to be comprised of a stochastic digital pattern.

4. The method according to claim 2, further comprising selecting the digital pattern to be comprised of fixed high levels and fixed low levels.

5. The method according to claim 4, further comprising selecting a duration of the fixed high levels and the fixed low levels to be different, respectively.

6. The method according to claim 1, further comprising selecting the intermissions between the sequential burst signals to have a fixed duration.

7. The method according to claim 1, further comprising selecting a temporal sequence of the burst signals to be random.

8. The method according to claim 1, further comprising sending other types of signals in the intermissions between the sequential burst signals.

9. The method according to claim 1, further comprising selecting the burst signals to be a deterministic analog alternating current signal with a period of predetermined temporal length.

10. The method according to claim 1, further comprising providing a temporally predetermined receiving window for receiving the burst signals in the at least one receiving coil.

11. The method according to claim 10, further comprising adjusting opening and closing of the receiving window to a sequence of the burst signals sent through the first border delimitation wire.

12. The method according to claim 1, wherein the received pattern of the received signal represents a temporal derivative of the predetermined pattern of the burst signal.

13. The method according to claim 1, further comprising evaluating the received pattern of the received signal as a whole.

14. The method according to claim 1, further comprising providing a second border delimitation wire delimiting a second surface, wherein the second surface overlaps the first surface.

15. The method according to claim 1, the power tool being a self-propelled lawn mower.

* * * * *